United States Patent Office 3,178,372
Patented Apr. 13, 1965

3,178,372
STABILIZED TRICHLOROCYANURIC ACID COMPOSITIONS
Jean Louis Emile Pomot, Neuilly, Seine, Emmanuel Jean François Luzarreta, Toulouse, Haute-Garonne, and Robert Léon Pierre Becanne, Pinsaguel, Haute-Garonne, France, assignors to Office National Industriel de l'Azote, a French body corporate
No Drawing. Filed Dec. 4, 1961, Ser. No. 156,941
Claims priority, application France, Dec. 7, 1960, 4,780
9 Claims. (Cl. 252—187)

The present invention relates to chemical compositions, particularly with a high active chlorine content, and to the preparation and use of such compositions.

It is known that trichlorocyanuric acid has a high chlorine content, and many attempts have been made to use this acid as a means of generating active chlorine. The main difficulties encountered in the widespread adoption of the use of trichlorocyanuric acid for this purpose are the result of its poor solubility in water and its lack of stability when stored in the dry state.

The main object of the present invention is the embodiment of compositions which contain trichlorocyanuric acid and which have a solubility in water and a storage stability which are greatly superior to those of trichlorocyanuric acid itself.

This object is realized by the present invention, according to which the desired chemical compositions—compositions in stable, finely divided form, with a high active chlorine content, soluble in water to render the active chlorine available—comprise trichlorocyanuric acid, and a tri-alkali metal (e.g. sodium or potassium) salt of cyanuric acid and/or an equivalent mixture of cyanuric acid and an alkali metal hydroxide, the proportions of these components being such that the final product contains one mole of cyanuric acid and three gram-equivalents of alkali metal in the form of alkali metal base, for every two moles of trichlorocyanuric acid.

In a preferred composition, the tri-alkali metal salt of cyanuric acid is a tri-sodium salt; the free alkaline base is sodium hydroxide or potassium hydroxide.

The compositions of the invention are in form of finely divided white powder which is particularly stable during storage in the dry state, during which time its active chlorine content remains practically constant at the ambient temperature.

The solid compositions of the present invention are essentially different, physically and chemically, from the corresponding alkaline salts of dichlorocyanuric acid, as may be ascertained for example from the absence in their X-ray diffraction diagrams of the characteristic lines of the said salts. These compositions, compared with the corresponding salts of dichlorocyanuric acid, have the advantage of being easier and cheaper to produce.

The invention also includes a process of preparing the new chemical compositions, comprising crushing and/or mixing homogeneously in the solid phase trichlorocyanuric acid and an equivalent mixture of cyanuric acid and an alkaline base until the composition has a predetermined grain size.

The chemical compositions of the present invention may be employed, as such or in admixture with solid adjuvants, in all applications for which trichlorocyanuric acid, or alkaline salts of dichlorocyanuric acid, are employed, that is, as chlorinating agents, oxidizing agents, bleaching agents, disinfectants, sterilizing agents, etc.

Presently-preferred embodiments of the invention are set forth in the illustrative examples which follow.

*Example 1*

46.5 parts by weight of trichlorocyanuric acid and 19.5 parts by weight of tri-sodium cyanurate are crushed and homogeneously admixed in the solid state.

The so-obtained composition is stable over long periods of storage. Its content of active chlorine is 31.52% by weight.

To render its active chlorine available, it is dissolved in water, its solubility (grams per liter of water at 20° C.) being about 230. The pH, at 20° C., of a 1% (by weight) aqueous solution of the composition is 5.9.

*Example 2*

46.5 parts by weight of trichlorocyanuric acid, 12.9 parts by weight of cyanuric acid and 12.0 parts by weight of sodium hydroxide are crushed and homogeneously admixed in the solid state.

The so-obtained composition is stable over long periods of storage. Its content of active chlorine is 29.65% by weight.

To render its active chlorine available, it is dissolved in water, its solubility (grams per liter of water at 20° C.) being about 240. The pH, at 20° C., of a 1% (by weight) aqueous solution of the composition is 5.9.

*Example 3*

93.0 parts by weight of trichlorocyanuric acid, 19.5 parts by weight of tri-sodium cyanurate, 12.9 parts by weight of cyanuric acid and 12.0 parts by weight of sodium hydroxide are crushed and homogeneously admixed in the solid state.

The so-obtained composition is stable over long periods of storage. Its content of active chlorine is 30.58% by weight.

To render its active chlorine available, it is dissolved in water, its solubility (grams per liter of water at 20° C.) being about 235. The pH, at 20° C. of a 1% (by weight) aqueous solution of the composition is 5.9.

As is manifest from the foregoing illustrative examples, the new compositions of the invention may advantageously be constituted by I. (a) Trichlorocyanuric acid and (b) tri-alkali metal cyanurate (e.g. sodium cyanurate or potassium cyanurate);

II. (a) Trichlorocyanuric acid, and (b) tri-alkali metal cyanurate or (c) a mixture of cyanuric acid and alkali metal hydroxide in such proportions as effectively to form tri-alkali metal cyanurate.

As previously indicated, the composition contains, for every two moles of ingredient (a), effectively one mole of cyanuric acid (as such or as cyanurate) and three gram-equivalents of alkali metal.

Having thus disclosed the invention, what is claimed is:

1. A chemical composition, in stable, dry, finely divided form and with high active chlorine content, soluble in water to render the active chlorine available, said composition consisting essentially of an intimate and homogeneous solid phase admixture of trichlorocyanuric acid and a tri-alkali metal salt of cyanuric acid, the proportions of said components being such that the composition contains one mole of tri-alkali metal cyanurate for every two mols of trichlorocyanuric acid, the alkali metal being selected from the group consisting of sodium and potassium.

2. A chemical composition, in stable, dry, finely divided form and with high active chlorine content, soluble in water to render the active chlorine available, said composition consisting essentially of an intimate and homogeneous solid phase admixture of trichlorocyanuric acid, cyanuric acid and alkali metal hydroxide, the proportions of said components being such that the composition contains, for each two moles of trichlorocyanuric acid, one mole of cyanuric acid and three gram-equivalents of alkali metal, the alkali metal being selected from the group consisting of sodium and potassium.

3. A chemical composition, in stable, dry, finely divided form and with high active chlorine content, soluble in water to render the active chlorine available, said composition consisting essentially of an intimate and homogeneous solid phase admixture of trichlorocyanuric acid, tri-alkali metal cyanurate, and a mixture of cyanuric acid and alkali metal hydroxide, the proportions of ingredients being such that the composition contains for each two moles of trichlorocyanuric acid, one mole of cyanuric acid and three gram-equivalents of alkali metal, the alkali metal being selected from the group consisting of sodium and potassium.

4. The method of imparting storage stability and enhanced water-solubility to solid trichlorocyanuric acid which comprises finely dividing and homogeneously and intimately admixing the same in the solid phase with finely divided solid tri-alkali metal salt of cyanuric acid, the proportions of ingredients being such that the composition contains one mole of tri-alkali metal cyanurate for every two mols of trichlorocyanuric acid, the alkali metal being selected from the group consisting of sodium and potassium.

5. The method of imparting storage stability and enhanced water-solubility to solid trichlorocyanuric acid which comprises finely dividing and homogeneously and intimately admixing the same in the solid phase with finely divided solid cyanuric acid and finely divided solid alkali metal hydroxide, the proportions of ingredients being such that the composition contains, for each two moles of trichloro cyanuric acid, one mole of cyanuric acid and three gram-equivalents of alkali metal, the alkali metal being selected from the group consisting of sodium and potassium.

6. The method of imparting storage stability and enhanced water-solubility to solid trichlorocyanuric acid which comprises finely dividing and homogeneously and intimately admixing the same in the solid phase with finely divided solid tri-alkali metal cyanurate and a finely divided solid mixture of cyanuric acid and alkali metal hydroxide, the proportions of ingredients being such that the composition contains, for each two moles of trichlorocyanuric acid, one mole of cyanuric acid and three gram-equivalents of alkali metal, the alkali metal being selected from the group consisting of sodium and potassium.

7. A chemical composition, in stable, dry, finely divided form and with high active chlorine content, soluble in water to render the active chlorine available, said composition consisting essentially of an intimate and homogeneous solid phase admixture of 46.5 parts by weight of trichlorocyanuric acid and 19.5 parts by weight of tri-sodium cyanurate.

8. A chemical composition, in stable, dry, finely divided form and with high active chlorine content, soluble in water to render the active chlorine available, said composition consisting essentially of an intimate and homogeneous solid phase admixture of 46.5 parts by weight of trichlorocyanuric acid, 12.9 parts by weight of cyanuric acid and 12.0 parts by weight of sodium hydroxide.

9. A chemical composition, in stable, dry, finely divided form and with high active chlorine content, soluble in water to render the active chlorine available, said composition consisting essentially of an intimate and homogeneous solid phase admixture of 93.0 parts by weight of trichloro-cyanuric acid, 19.5 parts by weight of tri-sodium cyanurate, 12.9 parts by weight of cyanuric acid and 12.0 parts by weight of sodium hydroxide.

References Cited by the Examiner
UNITED STATES PATENTS

| 2,607,738 | 8/52 | Hardy | 252—99 |
| 2,913,460 | 11/59 | Brown et al. | 252—187 XR |
| 2,980,622 | 4/61 | Symes | 252—102 XR |

FOREIGN PATENTS 219,930  1/59  Australia.

OTHER REFERENCES

Monsanto "Technical Data Sheet," April 1, 1959.

JULIUS GREENWALD, *Primary Examiner.*